United States Patent
College et al.

(10) Patent No.: US 9,656,876 B1
(45) Date of Patent: May 23, 2017

(54) METHOD FOR REDUCING ELEMENTAL SULFUR IN GYPSUM PRODUCTS

(71) Applicant: CertainTeed Gypsum, Inc.

(72) Inventors: John W. College, Pittsburgh, PA (US); Sang-Ho Lee, North Grafton, MA (US); Chris Hilton, Vancouver (CA); Yu-Zhi Kiang, Vancouver (CA); Choung-Houng Lai, Acton, MA (US); George Glavin, Amherst, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 14/931,766

(22) Filed: Nov. 3, 2015

(51) Int. Cl.
*C01F 11/46* (2006.01)

(52) U.S. Cl.
CPC .......... *C01F 11/468* (2013.01); *C01F 11/466* (2013.01)

(58) Field of Classification Search
CPC ................................ C01F 11/46; C01F 11/468
See application file for complete search history.

(56) References Cited

U.S. PATENT DOCUMENTS

| | | | | |
|---|---|---|---|---|
| 2,197,003 | A * | 4/1940 | Mowids | C01F 11/46 423/150.3 |
| 3,326,633 | A * | 6/1967 | Carothers | C01B 9/08 106/775 |
| 6,073,771 | A | 6/2000 | Pressley et al. | |
| 2005/0126430 | A1 | 6/2005 | Lightner et al. | |
| 2005/0161853 | A1 | 7/2005 | Miller et al. | |
| 2005/0287318 | A1 | 12/2005 | Speer et al. | |
| 2013/0186032 | A1 | 7/2013 | Stork | |
| 2015/0030532 | A1 | 1/2015 | Sahin et al. | |

FOREIGN PATENT DOCUMENTS

JP          5880488 B2 *    3/2016    ............. C01G 49/06

* cited by examiner

*Primary Examiner* — Timothy Vanoy
(74) *Attorney, Agent, or Firm* — GrayRobinson, P.A.; Michael J. Colitz, III

(57) ABSTRACT

Disclosed are various methods for reducing levels of elemental sulfur within gypsum products such as wall board. Gypsum sometimes includes increased levels of elemental sulfur. Such sulfur can be corrosive and otherwise harmful at elevated levels. The disclosure contemplates reacting the elemental sulfur with copper to copper sulfide. This reaction has the benefit of reducing the levels of elemental sulfur present within the final gypsum product. The copper can be added at any of a variety of locations in the manufacturing process. This is a very efficient method for reducing elemental sulfur in the production of gypsum products.

27 Claims, 4 Drawing Sheets

METHOD FOR REDUCING ELEMENTAL SULFUR IN GYPSUM PRODUCTS

TECHNICAL FIELD

This disclosure relates to a method for reducing elemental sulfur in gypsum products. More specifically, the disclosure relates to reducing elemental sulfur in gypsum via the addition of copper.

BACKGROUND OF THE INVENTION

Gypsum board is one of the most widely used and versatile building materials in the world. The basic construction for gypsum building boards has remained unchanged for quite some time. This construction includes a core of calcium sulfate dihydrate ($CaSO_4$ $2H_2O$) that is sandwiched between opposing paper sheets.

The gypsum can be either artificially produced or mined. Naturally occurring gypsum must be ground and crushed in a mill prior to use. Thereafter the ground gypsum is heated in a kettle whereby it is calcined to produce calcium sulfate hemihydrate ($CaSO_4$ $½H_2O$) (or stucco) in accordance with the following equation:

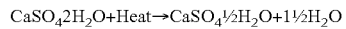
$$CaSO_4 2H_2O + Heat \rightarrow CaSO_4 ½H_2O + 1½H_2O$$

The calcined gypsum is thereafter mixed with water to form a stucco slurry. Other additives can be included such as accelerators, retarders, or starches. The slurry is advantageous because it allows the gypsum to be formed into any of a variety of shapes or sizes. In the manufacture of gypsum building boards, the slurry is poured out over a bottom sheet in a manufacturing line. A top sheet is then used to enclose the gypsum. The edges of the lower sheet can be turned up to form the edges of the wallboard. Further forming can take place via the use of rollers, guides, or hinge plates that are spaced out over a series of forming tables.

As the board passes over the forming tables, the water reacts with the stucco to reverse the above noted equation. As a result, the calcium sulfate hemihydrate ($CaSO_4$ $½H_2O$) is converted to calcium sulfate dihydrate ($CaSO_4$ $2H_2O$) in accordance with the following equation:

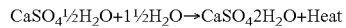
$$CaSO_4 ½H_2O + 1½H_2O \rightarrow CaSO_4 2H_2O + Heat$$

After the gypsum completely sets, the boards are delivered to a gypsum board dryer where additional water vapor is driven out of the board. Finally, the boards are cut into desired lengths.

A significant problem has arisen regarding certain drywall that was imported into the United States from the People's Republic of China. Chinese drywall was imported into the United States during the housing boom starting around 2004. The gypsum used to produce this drywall had increased amounts of elemental sulfur. This elemental sulfur remained in the final gypsum wallboard. The suspicion was that the elemental sulfur produced sulfurous gas emissions, such as carbon disulfide, carbonyl sulfide, and hydrogen sulfide. Homeowners have reported that these emissions resulted in various household items becoming corroded. A litany of adverse health effects were also claimed as a result.

In response, the United States Congress passed the Drywall Safety Act of 2012 (DSA). The DSA was signed into law in 2013, Pub. L. No. 112-266, 126 Stat. 2437 (2013). The DSA directed the Consumer Products Safety Commission (CPSC) to promulgate a rule regarding acceptable levels of elemental sulfur in wallboard. In early 2015, the CPSC determined that ASTM C1396M-14a, "Standard Specification for Gypsum Board" was an acceptable standard that conformed to the requirements of the DSA and was consistent with elemental sulfur levels not associated with elevated rates of corrosion in the home. ASTM C1396M-14a was developed by Subcommittee C11.01 on Specifications and Test Methods for Gypsum Products of ASTM International. The CPSC's determinations mean that the elemental sulfur content limit in ASTM C1396M-14a shall soon be treated as a consumer product safety rule promulgated under the Consumer Product Safety Act (CPSA). ASTM C1396M-14a states that Gypsum board shall contain not greater than 10 parts per million (PPM) of orthorhombic cyclooctasulfur ($S_8$), when tested in accordance with Test Methods ASTM C471M.

The problems associated Chinese drywall have created a need to find ways to reduce or eliminate elemental sulfur from gypsum wall board. The present disclosure relates to methods of reducing elemental sulfur in gypsum via the addition of copper. The background art discloses various uses for copper in building materials.

For example, U.S. Pat. No. 8,926,855 to Thomas discloses building materials that include a dampening layer containing a plaster and a viscoelastic polymer. In certain embodiments, the dampening layer also includes a high atomic weight material, a high molecular density material, or a combination thereof. One example of such material is copper powder.

U.S. Pat. No. 6,676,744 to Merkley discloses fiber cement composite materials using cellulose fibers loaded with inorganic or organic substances. Copper is disclosed as one possible loading substance for the cellulose fibers.

U.S. Pub. App. 2015/0030532 to Sahin discloses an antimicrobial material comprising a metal ion charged with synthesized zeolite. Silver, zinc, and copper metal ion-charged zeolites can be used. The new construction materials are antimicrobial and prevent microorganism growth.

Although the above referenced inventions achieve their own individual objectives, none of the background art discloses reducing elemental sulfur in gypsum via the addition of copper.

SUMMARY OF THE INVENTION

The method of the present disclosure provides an advantage by producing gypsum products with reduced levels of elemental sulfur.

An advantage is realized by mixing copper with calcined gypsum, whereby elemental sulfur in the gypsum reacts with the copper at an elevated dry solids temperature.

Yet another advantage is achieved by mixing copper with the stucco prior to the addition of the water at the mixer, whereby elemental sulfur in the slurry reacts with the copper. The slurry typically contains 30% to 50% water. The slurry is thereafter violently mixed to ensure good sulfur/copper contact.

A further advantage is attained by reacting copper with heated gypsum within a board dryer to increase the reaction between the copper and any elemental sulfur within the gypsum.

The present disclosure realizes yet another advantage by efficiently and economically producing a gypsum product that contains levels of elemental sulfur that are compliant with ASTM C1396M-14a.

Another advantage is that by reducing levels of elemental sulfur, minerals containing up to 800 ppm of elemental sulfur can be successfully used in the production of gypsum products.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to methods for reducing levels of elemental sulfur within gypsum products such as wall board. Natural gypsum often includes increased levels of elemental sulfur. Such elemental sulfur can be corrosive and otherwise harmful at elevated levels. The disclosure contemplates reacting the elemental sulfur with copper to produce copper sulfide. This reaction has the benefit of reducing the levels of elemental or orthorhombic cyclooctasulfur ($S_8$) present within the final gypsum product. The copper can be added at any of a variety of locations in the manufacturing process. For example, the copper may be added prior to any calcining of the gypsum, at the output of a calciner, prior to the mixer, or within the mixer. The various methods of the present disclosure are described hereinafter.

Figure 1A:
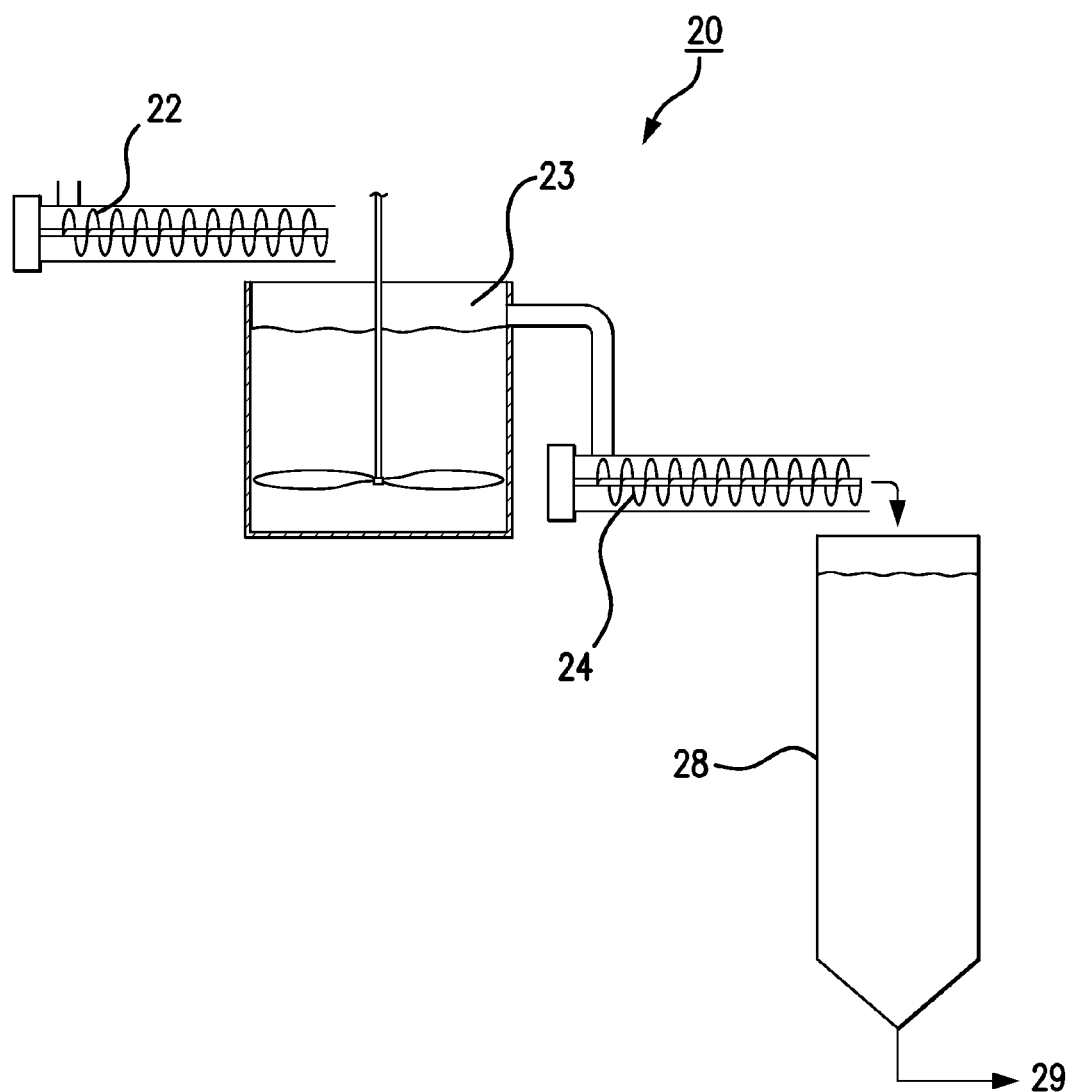
FIG. 1A is diagram of a calcination apparatus.

FIG. 1A illustrates an apparatus for calcining gypsum 20. Apparatus 20 includes a gypsum conveyor 22 for transporting a volume of gypsum from a source of stored gypsum (not shown). The stored gypsum can be natural or synthetic gypsum or combinations thereof. The gypsum is in the form of calcium sulfate dihydrate ($CaSO_4$ $2H_2O$). It is known that calcium sulfate dihydrate sometimes contains elevated levels of elemental sulfur (S) that can remain in the finished gypsum product. For example, in mineral form calcium sulfate dihydrate may contain up to 800 mg/kg (or 800 ppm) of elemental sulfur. Processed or recycled calcium sulfate dihydrate may contain up to 50 mg/kg (or 50 ppm) of elemental sulfur.

In the traditional process, the stored gypsum is ground in a mill then transported to a kettle 23 via conveyor 22, where the gypsum is heated and calcined. The calcining kettle 23 may be replaced by an impact mill for grinding and calcining. Calcination can also be carried out via calcidynes and Claudius Peter (CP) Mills. Kettle 23 includes a discharge conveyor 24 for subsequent transport of the calcined gypsum to a hot silo or to a stucco cooler and ultimately to a storage silo 28. An admix screw can be provided at 29 for the purpose of transporting the calcined gypsum to a mixer.

Figure 1B:
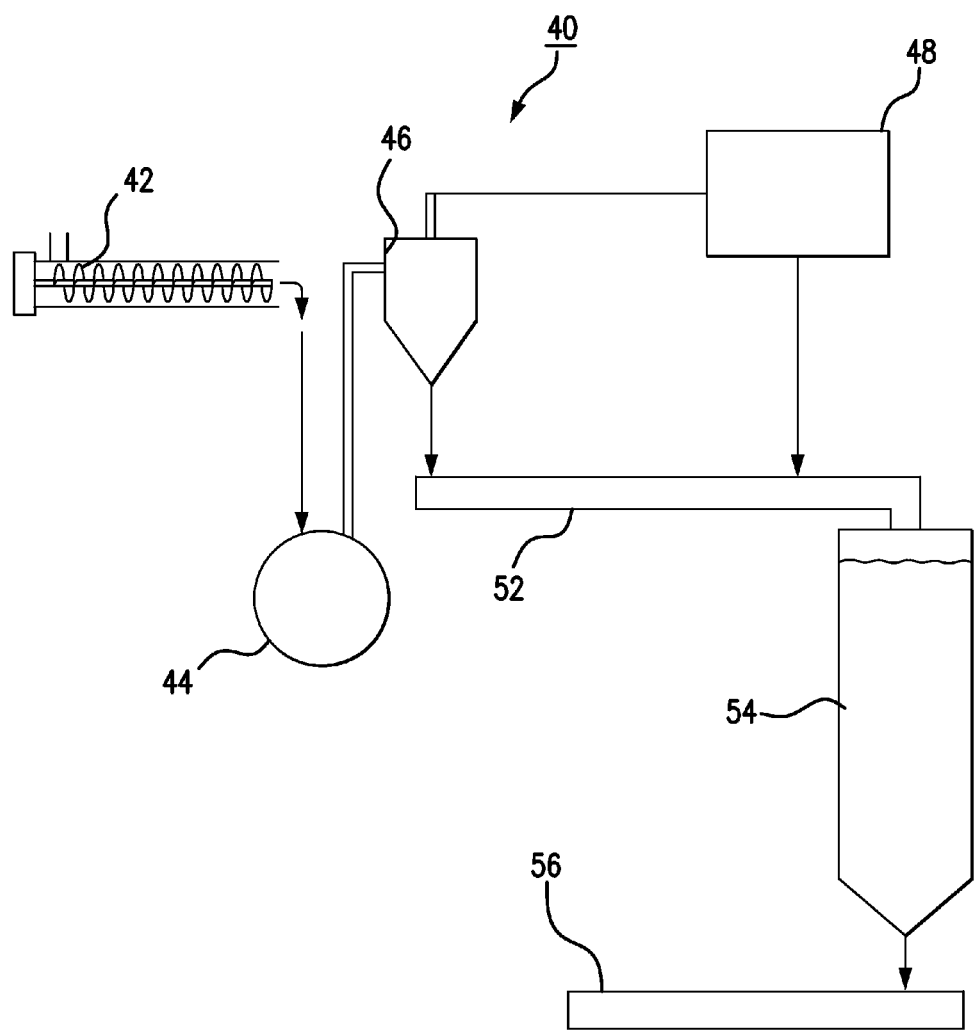
FIG. 1B is diagram of an additional calcination apparatus.

FIG. 1B illustrates an alternative calcining apparatus 40. Apparatus 40 likewise includes a gypsum conveyor 42 for transporting a volume of gypsum. This gypsum is then crushed and calcined in an impact mill or CP mill 44. A downstream cyclone 46 and bag house 48 are also included as is known in the art. The resulting stucco is then transported via screw 52 to storage silo 54. An additional conveyor 56 is included for transporting the stored stucco to the admix screw as needed.

As is known, heating the ground gypsum causes calcination to produce calcium sulfate hemihydrate ($CaSO_4$ $\frac{1}{2}H_2O$) (or stucco). Calcination temperatures are generally about 300 to 320° F. Calcination produces calcium sulfate hemihydrate ($CaSO_4$ $\frac{1}{2}H_2O$) and water vapor in accordance with the following equation:

$$CaSO_4 2H_2O + \text{Heat} \rightarrow CaSO_4 \tfrac{1}{2}H_2O + 1\tfrac{1}{2}H_2O$$

The calcium sulfate hemihydrate ($CaSO_4$ $\frac{1}{2}$ $H_2O$) likewise contains elevated amounts of elemental sulfur. This elemental sulfur level is reduced by mixing an amount of fine copper powder (Cu) with the calcium sulfate hemihydrate following the calcination. In one embodiment, the copper is added to kettle 23 following calcining. However, in the preferred embodiment, the copper is added along the discharge conveyor 24 of the calcining kettle 23 (FIG. 1A). This allows for optimal contact between the copper and elemental sulfur while the stucco is at an elevated temperature. In a similar fashion, with reference to FIG. 1B, the copper can be added to mill 44 or along conveyor 52. The amount of copper added can range from approximately 20 ppm to approximately 1000 ppm. Once mixed, the copper chemically reacts with the elemental sulfur within the calcium sulfate hemihydrate to produce copper sulfide ($Cu_2S$) in accordance with the following equation.

$$2Cu + S \rightarrow Cu_2S$$

It is preferable that the weight ratio between the fine copper powder and the elemental sulfur is approximately 4 to 1. However, ratios within the range of approximately 1:1 to approximately 4:1 can also be used. It has further been discovered that the reaction is most efficient if carried out while the calcium sulfate hemihydrate is still heated following calcination. A dry reaction temperature of about 300° F. has proven effective. In this part of the process, there is good mixing in conveyors and long reaction times in the storage silos. It must also go through other optimum areas like the mixer and the board dryer.

Figure 1C:
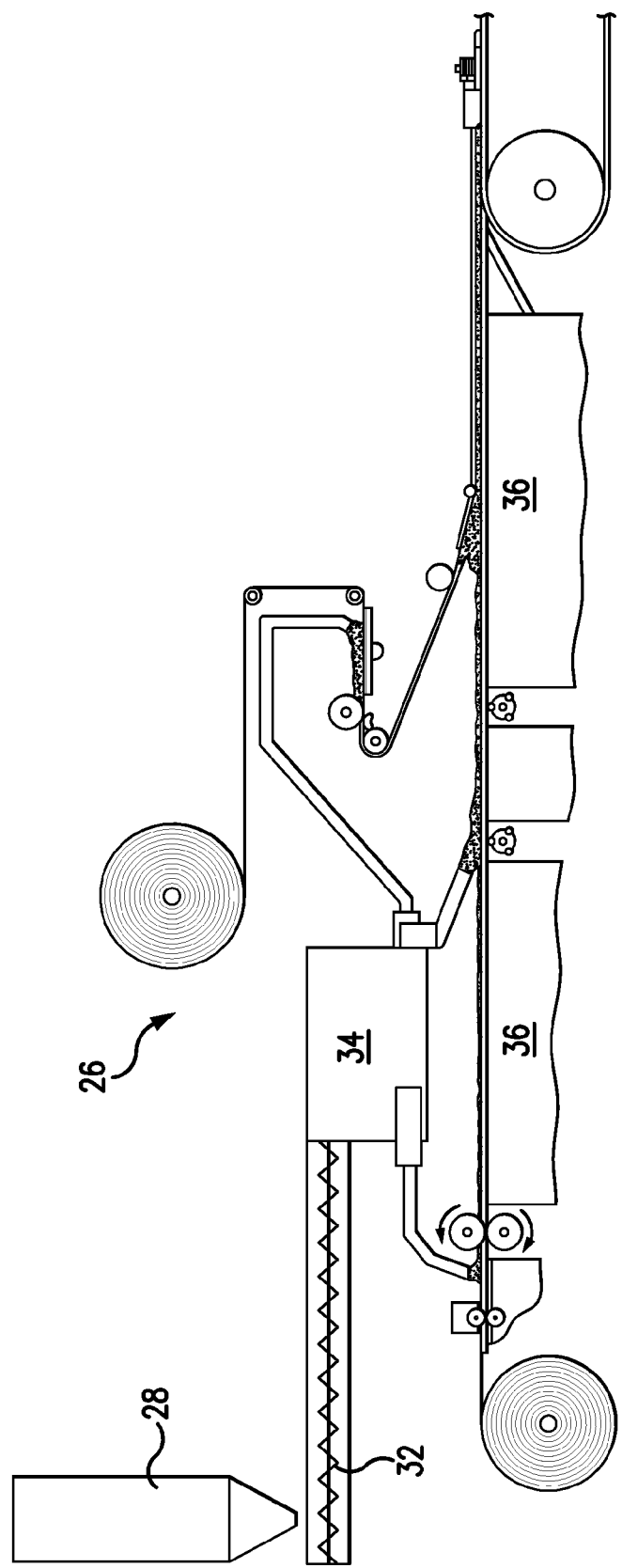
FIG. 1C is a diagram of a gypsum board forming line.

The production of copper sulfide is advantageous because it reduces the levels of elemental sulfur present in the calcium sulfate hemihydrate. The treated calcium sulfate hemihydrate can then be converted into a slurry and formed into a gypsum product. For example, the slurry can be used in a production line 26 to produce gypsum wall board (FIG. 1C). It has been discovered that utilizing the disclosed method reduces the amount of elemental sulfur within the final gypsum product to levels that comply with industry standards, such as ASTM C1396M-14a.

FIG. 1C illustrates a production line for forming gypsum boards. The line 26 includes a supply of calcined gypsum or stucco 28. Stucco is then delivered by an add screw 32 to a mixer 34. Add screw 32 can be used to mix water, accelerators, retarders, starches, and other constituents. This results in the formation of a gypsum slurry. In accordance with an alternative method of the present disclosure, the copper powder is added via the add mix screw 32 to the gypsum slurry. This again results in a reaction between the elemental sulfur and copper to form copper sulfide ($Cu_2S$). The elemental sulfur may also react with the copper to form either copper monosulfide (CuS) or copper disulfide ($CuS_2$).

The formation of copper sulfide, in turn, reduces the levels of elemental sulfur both within the slurry and in the final gypsum product. As is known in the art, the formed gypsum panels are delivered to one or more dryers to completely dry the gypsum panel before it is cut. It has been discovered that heating the panels results in a further reaction between the copper and sulfur and further reductions in the amount of elemental sulfur present within the board. This also improves the efficiency of the added copper resulting in less copper being needed to achieve the goal of 10 ppm.

The present inventors conducted various trials in which gypsum boards were produced in accordance with the present invention. The trials were carried out on a conventional gypsum board production line. Various types of boards were produced, including ⅝" Type X fire resistant board and ½" Easi-Lite™ Board. Easi-Lite™ is a lightweight gypsum board made by CertainTeed Gypsum, Inc. Copper powder was added to the gypsum slurry at varying rates. The trials were conducted at varying conveyor speeds and varying rates. The goal was to achieve an elemental sulfur content in the resulting board of less than 10 ppm. During the first trial, as noted in Table 1, with no copper added, the resulting elemental sulfur levels in the board ranged from 37.3 ppm to 52.0 ppm. Neither result complies with ASTM C1396M-14a. However, the elemental sulfur content was reduced below the 10 ppm threshold with the addition of copper in the amount of about 166 ppm. Further reductions were realized with copper amounts of up to about 532 ppm.

TABLE 1

Testing Data from Plant Trial No. 1

| Sample Number | Board Grade | Speed of Conveyor (fpm) | Copper Addition Rate (lb/min) | Total Amount of Copper (ppm) | Resulting Elemental Sulfur (ppm) |
|---|---|---|---|---|---|
| 1 | ⅝ X | 108 | 0.164 | 166 | 6.2 |
| 2 | ⅝ X | 108 | 0.328 | 332 | 6.3 |
| 3 | ⅝ X | 108 | 0.328 | 332 | 5.6 |
| 4 | ½ FBC | 125 | 0.519 | 532 | 3.6 |
| 5 | ½ FBC | 125 | 0.519 | 532 | 4.6 |
| 6 | ⅝" | n/a | control | 0 | 37.3 |
| 7 | ½" | n/a | control | 0 | 52.0 |

Subsequent trials were carried out on ½" Easi-Lite™ Board and a set conveyor speed of 145 fpm (Table 2). Again, as expected, with no copper added, the resulting elemental sulfur content was in excess of the targeted amount of 10 ppm. 172 ppm of copper resulted in an elemental sulfur content of between 3.31 ppm and 3.82 ppm.

TABLE 2

Testing Data from Plant Trial No. 2

| Sample Number | Board Grade | Speed of Conveyor (fpm) | Copper Addition Rate (lb/min) | Total Amount of Copper (ppm) | Resulting Elemental Sulfur (ppm) |
|---|---|---|---|---|---|
| 1 | ½ Easi-Lite | 145 | control | 0 | 35.5 |
| 2 | ½ Easi-Lite | 145 | control | 0 | 39.5 |
| 3 | ½ Easi-Lite | 145 | 0.14 | 172 | 3.31 |
| 4 | ½ Easi-Lite | 145 | 0.14 | 172 | 3.82 |
| 5 | ½ Easi-Lite | 145 | 0.255 | 314 | 1.00 |
| 6 | ½ Easi-Lite | 145 | 0.255 | 314 | 1.70 |
| 7 | ½ Easi-Lite | 145 | 0.43 | 530 | 1.61 |
| 8 | ½ Easi-Lite | 145 | 0.43 | 530 | 1.62 |
| 9 | ½ Easi-Lite | 145 | 0.154 | 189 | 2.13 |
| 10 | ½ Easi-Lite | 145 | 0.154 | 189 | 2.37 |
| 11 | ½ Easi-Lite | 145 | 0.246 | 303 | 1.12 |
| 12 | ½ Easi-Lite | 145 | 0.246 | 303 | 1.53 |
| 13 | ½ Easi-Lite | 145 | 0.429 | 528 | 1.24 |
| 14 | ½ Easi-Lite | 145 | 0.429 | 528 | 1.35 |
| 15 | ½ Easi-Lite | 145 | control | 0 | 35.1 |
| 16 | ½ Easi-Lite | 145 | control | 0 | 43.4 |

Figure 2:
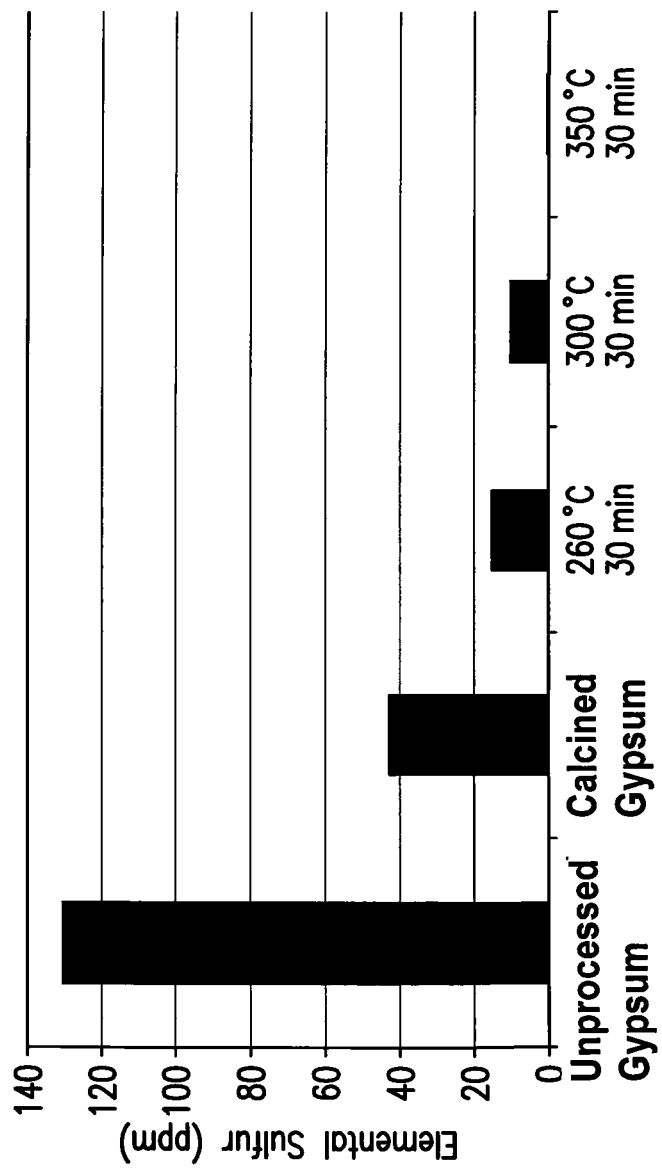
FIG. 2 is a graph showing the levels of elemental sulfur present at various points during calcination.

FIG. 2 illustrates that rates of elemental sulfur (shown in parts per million "ppm") are reduced by facilitating the copper-sulfur reaction via increased calcination temperatures. Calcination generally takes place at about 320° F. However, further reductions in elemental sulfur can occur if temperatures are increased to 500° F. (260° C.), 572° F. (300° C.) and 662° F. (350° C.). FIG. 2 illustrates the effect of calcining at these temperatures for about 30 min. As illustrated, the levels of elemental sulfur present in unprocessed gypsum is about 130 ppm.

The addition of copper power (Cu) can also be used to enhance other physical properties of the resulting gypsum product. For example, copper has also been found to be a strong anti-microbial and mold inhibitor. By adding copper power to the gypsum or gypsum slurry, the resulting gypsum products have an increased ability to resist mold and mildew growth.

The present inventors conducted a series of tests on gypsum boards constructed in accordance with the present invention. The testing was carried out in accordance with ASTM D3273, entitled "Standard Test Method for Resistance to Growth of Mold on the Surface of Interior Coatings in an Environmental Chamber." The contents of ASTM D3273 are incorporated herein by reference. Tables 3 and 4 below indicate that varying levels of copper were added to the subject boards. The rate of copper addition varied from 0 ppm to 500 ppm. The tests were conducted over a span of four weeks. In accordance with ASTM D3273, the presence of mold or mildew was rated from 0 to 10. A score of 10 indicates that no mold growth was detected and a score of 9 indicates that 10% of the sample showed mold growth, and so on.

TABLE 3

Mold or Mildew Resistance according to ASTM D3273 Front Side of Board

| Week No. | 0 PPM Cu | 100 PPM Cu | 200 PPM Cu | 500 PPM Cu |
|---|---|---|---|---|
| 1 | 10 | 10 | 10 | 10 |
| 2 | 9 | 10 | 10 | 10 |
| 3 | 7 | 9 | 10 | 10 |
| 4 | 6 | 7 | 9 | 10 |

TABLE 4

Mold or Mildew Rate according to ASTM D3273 Back Side of Board

| Week No. | 0 PPM Cu | 100 PPM Cu | 200 PPM Cu | 500 PPM Cu |
|---|---|---|---|---|
| 1 | 10 | 10 | 10 | 10 |
| 2 | 9 | 10 | 10 | 10 |
| 3 | 8 | 8 | 10 | 9 |
| 4 | 7 | 6 | 9 | 8 |

The tests reveal that without any added copper, mold and mildew start growing on the board within two weeks with slightly higher levels of growth on the back side of the board. However, this growth is inhibited with copper levels of 100 ppm. Mold and mildew are completely eradicated when copper levels approach 500 ppm. The inventors believe that the added copper acts as a mold inhibitor in the resulting gypsum product. The added copper also reacts to produce copper sulfide ($Cu_2S$), which may also act as a mold inhibitor.

The present method describes adding copper to produce copper sulfide ($Cu_2S$) and thereby reduce levels of elemental sulfur. The creation of other metal sulfide products may likewise suffice to reduce elemental sulfur levels. For example, adding zinc (Zn), iron (Fe), manganese (Mn), nickel (Ni), cobalt (Co), or metal oxides in place of the copper powder (Cu) may achieve similar beneficial results in terms of both reducing elemental sulfur and inhibiting mold.

Table 5 reflects additional testing carried out in accordance with the present invention. This testing was carried out by adding the copper via the admix screw at a location just before the mixer. Although it may be preferable to add the copper upstream of this point, adding it immediately before the mixer represents the easiest point of introduction. The "Sample ID" reflects that the tests were carried out on ½" Easi-Lite™ Board. It appears that a specified copper addition rate of 300 ppm yields targeted results of less than 10 ppm of elemental sulfur (S). It is envisioned that this addition rate could be brought down to approximately 200 ppm while still achieving beneficial results.

TABLE 5

Additional Testing Data from Plant

| Sample No. | Board Grade | Estimated Cu (ppm) (Based upon feeder rate) | Measured Cu (ppm) | Measured Elemental Sulfur (ppm) |
|---|---|---|---|---|
| 1 | ½ Easi-Lite | 200 | 126 | 14.4 |
| 2 | ½ Easi-Lite | 200 | 163 | 10.3 |
| 3 | ½ Easi-Lite | 300 | 164 | 10.4 |
| 4 | ½ Easi-Lite | 300 | 159 | 9.4 |
| 5 | ½ Easi-Lite | 500 | 391 | 6.1 |
| 6 | ½ Easi-Lite | 500 | 377 | 5.3 |

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for reducing of presence of elemental sulfur in a gypsum product, the method comprising the following steps:
   providing stucco to be used in the production of the gypsum product, the stucco including a level of elemental sulfur;
   mixing copper into the stucco;
   allowing the copper to react with the elemental sulfur, the reaction reducing the level of elemental sulfur within the stucco;
   utilizing the stucco with the reduced level of elemental sulfur in the production of gypsum product.

2. The method as described in claim 1 wherein the reaction between the copper and the elemental sulfur produces copper sulfide ($Cu_2S$).

3. The method as described in claim 1 wherein the reaction between the copper and elemental sulfur produces copper monosulfide (CuS).

4. The method as described in claim 1 wherein the reaction between the copper and elemental sulfur produces copper disulfide ($CuS_2$).

5. The method as described in claim 1 wherein the level of elemental sulfur within the gypsum following the reaction is below that described in ASTM C1396M-14a.

6. A method for reducing elemental sulfur in a gypsum product, the method comprising the following steps:
   forming a gypsum slurry comprising calcium sulfate hemihydrate ($CaSO_4$ ½ $H_2O$) and water, the gypsum slurry also including an amount of elemental sulfur;
   mixing an amount of fine copper powder into the gypsum slurry;
   allowing the copper to react with the elemental sulfur within the gypsum slurry, the reaction producing copper sulfide ($Cu_2S$);
   the production of the copper sulfide ($Cu_2S$) reducing the amount of elemental sulfur present in the gypsum slurry;
   utilizing the gypsum slurry in the production of the gypsum product.

7. The method as described in claim 6 wherein the slurry includes a starch and a retarder.

8. The method as described in claim 6 wherein the slurry further comprises one or more of the following: foam, wax, glass fibers, and sugars.

9. The method as described in claim 6 wherein the level of elemental sulfur within the gypsum following the reaction is below that described in ASTM C1396M-14a.

10. The method as described in claim 6 wherein the gypsum product is a wall board.

11. A method for reducing elemental sulfur in gypsum wallboard, the method comprising the following steps:
    providing a volume of calcium sulfate dihydrate ($CaSO_4$ $2H_2O$) containing an amount of elemental sulfur;
    crushing the calcium sulfate dihydrate ($CaSO_4$ $2H_2O$) in a mill;
    heating and calcining the crushed calcium sulfate dihydrate ($CaSO_4$ $2H_2O$) to produce calcium sulfate hemihydrate ($CaSO_4$ ½ $H_2O$), the calcium sulfate hemihydrate ($CaSO_4$ ½ $H_2O$) containing an amount of elemental sulfur;
    mixing an amount of fine copper powder with the calcium sulfate hemihydrate ($CaSO_4$ ½ $H_2O$), with the weight ratio between the fine copper powder and the elemental sulfur in the gypsum being in the range of approximately 1 to 1 to approximately 4 to 1;
    allowing the copper to react with the elemental sulfur within the heated calcium sulfate hemihydrate ($CaSO_4$ ½ $H_2O$), the reaction producing copper sulfide ($Cu_2S$);
    the production of the copper sulfide ($Cu_2S$) reducing the amount of elemental sulfur (S) present in the calcium sulfate hemihydrate ($CaSO_4$ ½ $H_2O$);
    utilizing the calcium sulfate hemihydrate ($CaSO_4$ ½ $H_2O$) in the production of gypsum wallboard.

12. The method as described in claim 11 wherein the method further comprises the step of collecting ground fines and wherein the copper powder is added after the ground fines are collected.

13. The method as described in claim 11 wherein zinc (Zn), iron (Fe), manganese (Mn), nickel (Ni), or Cobalt (Co) are used in place of the copper powder (Cu).

14. The method as described in claim 11 wherein metallic oxides are used in place of the copper powder.

15. The method as described in claim 11 wherein the copper powder is added to the gypsum feed stream.

16. The method as described in claim 11 wherein the copper powder is added immediately after the formation of a stucco slurry.

17. The method as described in claim 11 wherein the copper powder is directly added after calcination.

18. The method as described in claim 11 wherein the copper powder is added via a stucco feed stream.

19. The method as described in claim 11 wherein a board dryer is used to increase the efficiency of the reaction between the copper and the elemental sulfur.

20. The method as described in claim 11 wherein the efficiency of the reaction between the copper and the elemental sulfur is increased via residence times within a silo.

21. The method as described in claim 11 wherein the weight ratio between the fine copper powder and the elemental sulfur in the gypsum is in the range of approximately 1 to 1 to approximately 4 to 1.

22. The method as described in claim 11 wherein the copper powder is added to the calciner feed stream.

23. A method for producing a gypsum product with enhanced physical properties, the method comprising:
   providing a volume of gypsum, the gypsum containing an amount of elemental sulfur;
   mixing an amount of copper powder with the gypsum;
   allowing the copper to react with the elemental sulfur in the gypsum;
   utilizing the gypsum in the production of the gypsum product.

24. The method as described in claim 23 wherein the amount of added copper is greater than 500 ppm and the enhanced physical property in the gypsum product is inhibited mold and mildew growth.

25. The method as described in claim 23 wherein copper is added in range of approximately 20 ppm to approximately 1000 ppm and the enhanced physical property in the gypsum product is inhibited mold and mildew growth.

26. The method as described in claim 23 comprising the further step of calcining the gypsum and wherein the step of mixing the copper powder is carried out before the calcining step.

27. The method as described in claim 23 comprising the further step of calcining the gypsum and wherein the step of mixing the copper powder is carried out after the calcining step.

* * * * *